United States Patent

Helinski

[15] 3,680,590

[45] Aug. 1, 1972

[54] FLUID-OPERATED DIAPHRAGM LOGIC DEVICES

[72] Inventor: Edward F. Helinski, Johnson City, N.Y.

[73] Assignee: International Business Machines Corporation, Armonk, N.Y.

[22] Filed: Oct. 19, 1970

[21] Appl. No.: 81,711

[52] U.S. Cl.............137/608, 132/81.5, 235/201 ME

[51] Int. Cl. ..............................F17d 1/00, F15c 3/04

[58] Field of Search................137/81.5; 235/201 ME

[56] References Cited

UNITED STATES PATENTS 3,318,329 5/1967 Norwood...............235/201 ME
3,508,848 4/1970 Schmidlin................137/81.5 X
3,156,157 11/1964 Smith et al.............235/201 ME
3,433,257 3/1969 Jensen...................235/201 ME
3,500,853 3/1970 Freeman..................137/81.5 X
3,584,639 6/1971 Potepalor et al.........137/81.5 X

*Primary Examiner*—Samuel Scott
*Attorney*—Hanifin & Jancin and Kenneth P. Johnson

[57] ABSTRACT

A family of fluid-actuated devices for performing logical AND, LATCH and OR functions in response to input pressure signals in which a diaphragm forms a common boundary separating a bias chamber from an output signal chamber and two or more input signal chambers. Variations in signal chamber sizes and particular pressure relationships enable accomplishment of the several logical functions with low power consumption in a compact package.

10 Claims, 10 Drawing Figures

PATENTED AUG 1 1972 3,680,590

Figure 1A:
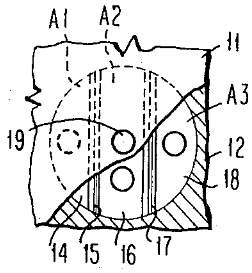

INVENTOR
EDWARD F. HELINSKI

BY K. R. Johnson
ATTORNEY

FLUID-OPERATED DIAPHRAGM LOGIC DEVICES

BACKGROUND OF THE INVENTION

In the past, fluid logic devices having a flexible diaphragm to control fluid flow have required a separate diaphragm device for control by each input signal. Because of this, the standard AND and OR logic functions with several inputs use disproportionately large numbers of fluid devices which become a limitation in attempts to miniaturize the circuit package in a control system.

In its usual applications, the diaphragm control device is an active device, i.e., one which fluid is flowing most of the time and adding energy to the system. With devices having to be added for each input signal in various stages, power requirements increase. System reliability, of course, is reduced as the number of devices becomes larger, and cost is greater.

Accordingly, it is a primary object of this invention to provide a fluidic device of the diaphragm type in which logic functions can be performed among multiple input signals with the use of a single diaphragm.

Another important object of this invention is to provide a fluidic device having more efficient fan-in capabilities among several input signals.

Other objects of this invention include the provision of a fluidic device for logic functions that: reduces the number of devices formerly required for a circuit; is a passive device which improves energy requirements; and enables the construction of simpler, more compact circuit configurations.

SUMMARY OF THE INVENTION

In the attainment of the foregoing objects, the invention provides a flexible diaphragm to divide a chamber into a bias compartment on one side of the diaphragm and a plurality of smaller signal chambers on the opposite side. Fluid pressure signals are supplied to the bias compartment and input signal compartments to produce opposing forces on the diaphragm. The diaphragm is normally in a position to isolate each signal chamber as the result of the continuous bias signal. However, when an input signal or combination of input signals are present in the proper pressure relationship to be bias pressure, as determined by the diaphragm surface area exposed to the pressures, the diaphragm will move to a position to permit joining one or more input signal compartments with the output signal compartment. This operation enables construction of logical AND, LATCH and OR devices with a minimum number of diaphragms.

The invention advantageously permits the combination of two or more input signals to produce the AND function and many inputs to produce the OR function with a single diaphragm. As a result, circuit fan-in can be easily accomplished, and the number of devices formerly required in a circuit can be reduced. The invention has the feature of being a passive device in which little energy is put into the circuit in the absence of the proper combination of input signals. The reduction of the number of devices, of course, enables a larger number of circuits per unit volume of package.

Figure 1B:
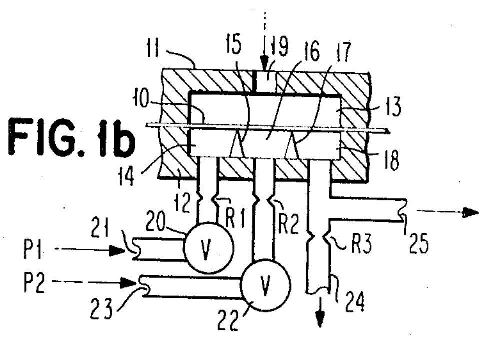
Figure 2A:
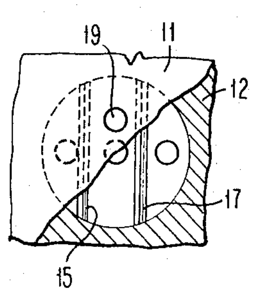
Figure 2B:
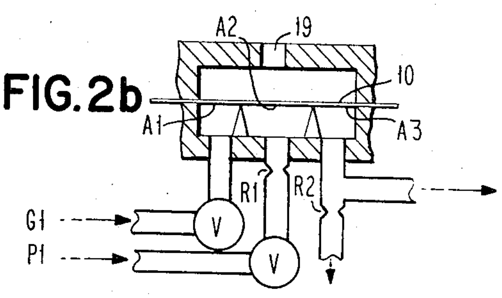
Figure 3A:
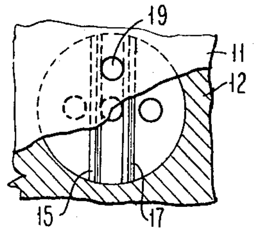
Figure 3B:
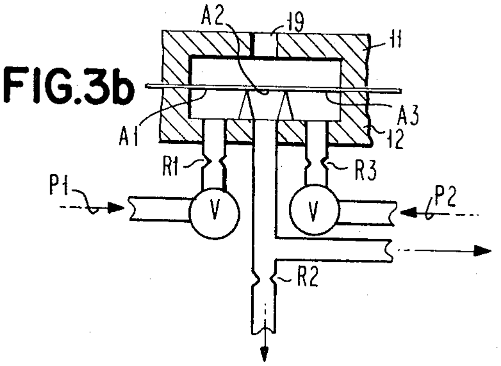
Figure 4:
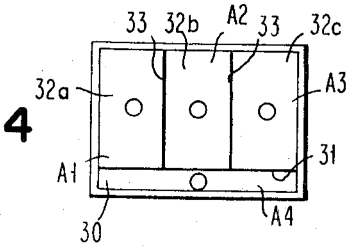
Figure 6:
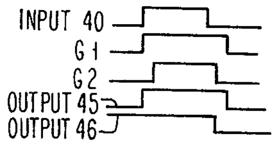
Figure 5:
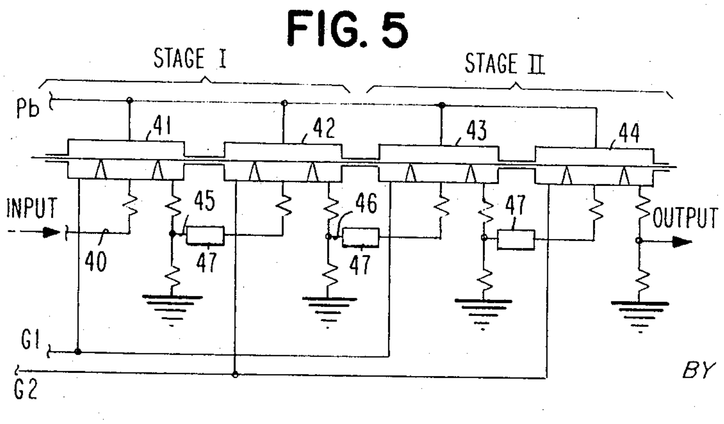
Figure 7:
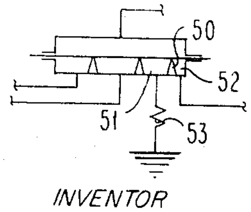

The foregoing and other objects, features and advantages of the invention will be apparent from the following more particular description of preferred embodiments of the invention, as illustrated in the accompanying drawings wherein:

FIGS. 1*a* and 1*b* are respective plan and elevation views, partially in section, of a fluid logic AND element constructed in accordance with the invention;

FIGS. 2*a* and 2*b* are respective plan and elevation views, partially in section, of a fluid logic LATCH element obtained by modification of the device of FIGS. 1*a* and 1*b*;

FIGS. 3*a* and 3*b* are respective plan and elevation views, partially in section, of a fluid logic OR element obtained by another modification of the device of FIGS. 1*a* and 1*b*;

FIG. 4 is a plan view of a modification of the device shown in FIGS. 3*a* and 3*b* to provide more input connections; and FIGS. 5 and 6 are respective schematic and timing diagrams for a shift register constructed of devices shown in FIGS. 2*a* and 2*b*;

FIG. 7 is a schematic showing the two subcavities which comprise a built in diode.

Referring to FIGS. 1*a* and 1*b*, a flexible, fluid-impervious diaphragm 10 is sandwiched between two elements 11 and 12. Element 11 is recessed to form bias chamber 13 on one side of the diaphragm and element 12 is formed with a plurality of recesses 14, 16, 18 on the opposite side of the diaphragm to form signal chambers. The latter chambers are separated from one another by projections or walls 15, 17 of element 12 or pieces inserted in the element to provide separating walls.

An inlet duct 19 communicating with chamber 13 is connected to a suitable source of pressurized fluid, such as air, so as to provide a bias force acting on diaphragm 10 to urge the diaphragm into sealing contact with the peaks of walls 15 and 17 to form the individual signal chambers. Chamber 14 receives input pressure signals through its control valve 20 and duct 21, and chamber 16 receives its input through control valve 22 and duct 23. Each valve is connected to a source of fluid under suitable pressure, as will be described hereinafter. Chamber 18 provides output signals when diaphragm 10 is sufficiently deflected into chamber 13, and the signals are supplied through duct 24 to a low pressure sump indicated as atmosphere. A duct 25 is joined to duct 24 and serves to provide output pressure signals to a sensing or utilization device responsive to the signals. Each input and output signal duct has a respective flow restrictor R1, R2 and R3 for this configuration to maintain operating signal pressure levels when the diaphragm suddenly opens connecting the input channels to the output channel.

The device of FIGS. 1*a* and 1*b* can provide a logical AND function when connected to two selectively applied input signal pressures. By making the bias pressure $Pb$ a predetermined proportion of the two input signal pressures P1 and P2 and selecting proper diaphragm areas exposed to the input signals, the diaphragm will move away from the peaks of walls 15, 17 to connect the input signal chambers with the output signal chamber.

For example, assumed that $R1 = R2 = R3$; $P1 = P2 = Ps$ the supply pressure, while $Pb = 0.6\ Ps$; and effective diaphragm areas $A1 = A2 = A3$. Diaphragm 10 will be moved from its blocking position were P1 and P2 are acting coincidentally on areas A1 and A2 since $$P1A1 + P2A2 > Pb(A1 + A2 + A3) \text{ or}$$

$$Ps(\tfrac{2}{3}) > PbA$$

Also, since $Pb = 0.6Ps$, the application of either P1 or P2 only will result in no flow to the output or other input because $$PsA1 < 0.6Ps(A1 + A2) \text{ and}$$

$$PsA2 < 0.6Ps(A1 + A2) \text{ and}$$

$$PsA2 < 0.6Ps(A2 + A3)$$

Once the diaphragm is open, the flow must be sufficient to maintain that condition with stability unless one input signal is terminated. Since the impedance values of all restrictions are assumed to be equal, then it is seen that the two input restrictors are in parallel with each other and in series with the output restrictor. Therefore, the value of pressure Po at the output signal chamber would be approximately 0.8Ps in accordance with conductance theory. The diaphragm will remain open until one or both of the input signals terminates. The diaphragm should be capable of sufficient movement so that, when open, it does not add significantly to the flow impedance.

In FIGS. 2*a* and 2*b*, a LATCH configuration is illustrated which is a variation of the AND device and has nearly the same structure. In this device, the area of diaphragm 10 exposed to a gate input signal G1 is made small compared to that exposed to an input data bit signal P1. In order for the LATCH to be "set," both G1 and P1 must occur coincidentally. The LATCH will remain in the "set" condition, however, after removal of the data signal P1 by its valve because G1 is assumed to be at the supply pressure and has no restrictor in its input duct. When G1 signal is terminated with its valve, the LATCH will be "reset."

The operation will be more clearly understood by considering the following: Assume that $A1 = A3$ and $A2 = 2.5A1$; $R1 \geqq R2$; G1 (gating signal pressure) $=$ Ps (supply pressure), $P1 = 0.5Ps$ and $Pb = 0.6Ps$. Therefore:

$$G1A1 + P1A2 > Pb(A1 + A2)$$

$$PsA1 + (0.5Ps)(2.5A1) > 0.6Ps(A1 + 2.5A1)$$

$$2.25PsA1 > 2.1PsA1$$

Thus, the LATCH diaphragm will move toward the bias chamber to open A1 and A2 to each other. Since G1 has no restrictor to impede fluid flow, the pressure under those two areas will continue to increase until it reaches Ps and open the diaphragm completely because $$Ps(A1 + A2) > Pb(A1 + A2 + A3)$$

$$Ps(3.5A1) > 0.6Ps(4.5A1)$$

$$3.5PsA1 > 2.7PsA1$$

P1 may be removed and the output pressure Po will equal Ps. The device will remain open even if P1 is removed as long as G1 is on. Resetting or closing occurs upon removal of G1. Since $P1 = 0.5Ps < Pb$, it does not matter if P1 is on or off at the time resetting takes place.

FIGS. 3*a* and 3*b* illustrate another modification of the device of FIGS. 1*a* and 1*b* to obtain the logical OR function of two inputs. In this configuration, the walls 15 and 17 are placed so that areas A1 and A3 are much larger than the area A2 of the output chamber. Each of the input and output signal ducts has a respective flow restrictor R1, R2 and R3. In operation, the diaphragm is deflected into bias chamber 13 when an input signal is present at either or both input ducts P1 or P2 and provides an output signal Po. If no input signals are present, of course, there is no output signal.

Assume that $P1 = P2 = Ps$ while $Pb = 0.7Ps$, $A1 = A3$ and $A2 = 1/5A1$, and $R1 = R2$. R3 is selected so that the flow through R1 with R3 in series will result in an output pressure Po of 0.9Ps. When an input signal is present $$P1A1 > Pb(A1 + A2) \text{ or}$$

$$PsA1 > 0.7Ps(A1 + 1/5A1)$$

and if both input signals are present $$P1A1 + P2A3 > Pb(A1 + A2 + A3) \text{ or}$$

$$Ps(2A1) > 0.7Ps(2A1 + 1/5A1)$$

The diaphragm will remain displaced until both input signals have terminated since $Po > Pb$.

FIG. 4 shows a modification of the OR device of FIGS. 3*a* and 3*b* to connect additional input signals. In this arrangement, with signal chambers only shown schematically, output chamber 30 extends along one wall 31 which is common to all input signal chambers 32*a*, 32*b*, 32*c* each separated by a wall 33. Although not shown, only a single diaphragm and bias pressure chamber over the signal chambers is required. Each input and output signal duct includes a flow restrictor to maintain pressure levels when the diaphragm is opened.

As with the device of FIGS. 3a and 3b, each input signal P1, P2, P3 to respective chambers 32*a*, 32*b* and 32*c* is at the supply pressure. The bias pressure $Pb = 0.7Ps$, areas A1, A2 and A3 are equal, output area A4 is equal to 0.2A1, and input flow restrictors are equal while the output flow restrictor is chosen such that flow from any one of the input restrictors through the output restrictor equals 0.9Ps. With these values, any single input signal will be able to deflect the diaphragm at wall 31 adjacent output chamber 30 to produce an output signal. Thus, an input signal at one or more of chambers 32*a*, 32*b* and 32*c* will result in an output pressure signal from chamber 30. The arrangement of FIG. 4 can be readily extended to accommodate additional input signals by providing more compartments.

In FIG. 5 is a schematic illustration of a shift register which can be constructed from the LATCH device of FIGS. 2*a* and 2*b*. This shift register requires two fluidic devices for each data bit storage stage so that the register shown can store two data bits. Ducts are represented by single lines, restrictors by electrical resistance symbols and a sump by the electrical ground symbol. Data bits are applied serially as positive pressure pulses at the input, and gating pulses are supplied at the G1 and G2 ducts. Rectangles 47 in the ducts between devices are intended as delay volumes or extra duct lengths to prevent possible erratic operation due to close signal tolerances.

The operation of the shift register will be described with reference to FIG. 5 and the timing diagram of FIG. 6. It will be assumed that no information is stored, and gating signals G1 and G2 occur on a regularly recurring basis, and that a positive data bit signal may or may not occur with each G1 signal. When a positive data pulse occurs at the input, its pressure is sufficient with that of G1 signal to set Latch 41 by moving it diaphragm upward. This produces an output pressure signal from Latch 41 as an input at Latch 42 which is ineffective since pulse G2 is absent. A short time before G1 terminates, G2 is produced which is effective against the bias pressure with the signal at 45 to set the Latch by moving the diaphragm to the unblocked or open position. An output signal now occurs at 46. In the meantime, the termination of G1 and the input signal at Latch 41 permit reset of the Latch. The data bit stored at Latch 42 is blocked from further progression as long as signal G1 is down.

If a second input signal at 40 occurs when gate G1 again goes positive, Latch 41 will be set as will Latch 43 because the output pressure signal at 46 will coincide with the same gating signal G1. Latches 42 and 44 will then be reset by the fall of gate G2 so that Latches 41 and 43 serve temporarily as stores. When gate G2 rises near the end of gate G1, both Latches 42 and 44 will be set, and the termination of G1 will reset the other latches. It will be evident that the absence or presence of an input signal does not affect the transfer of data from stage to stage. Delay volumes 47 may be used to prevent erratic operation in the event that an output signal from a preceding Latch is generated too close to the termination of a gate signal at the following latch.

In the shift register, there are provided two series restrictors in each output duct and a restrictor in the connected input duct for the succeeding latch. These restrictors insure that any feedback pressure from an open latch is sufficiently low so that no inadvertent opening of a preceding latch will occur.

An alternate method of preventing possible feedback is to provide a fluidic diode. This can be done by including a separate chamber in the signal line with a biased diaphragm and single ridge positioned to make the forward or input compartment larger than the output or possible feedback compartment. A more efficient method, as shown in FIG. 7, is to construct the diode in the latch itself by forming the diode ridge 50 in the output signal cavity and with the output duct in the smaller 52 of these two sub-cavities 51, 52. The larger 51 of these two subcavities becomes "dead" volume with a high impedance path 53 to the sump to prevent pressure build-up but not substantially weaken any output signal. Any feedback pressure is then effective on only a small portion of the diaphragm that was over the original output cavity.

It will be noted that the configurations of the various logic devices need not be restricted to those shown. For example, concentric circular ridges or radial ridges may be employed, or square or rectangular configurations may be substituted for the round ones shown. When a departure is made to other configurations, however, the proportions of diaphragm area exposed to fluid forces need to be varied slightly in many situations to counteract stresses encountered at diaphragm corners. Larger surface area may be required in the cavities having a corner because of more resistance to diaphragm displacement.

A further variation that will be noted is to provide valve means to change the biasing pressure in certain configurations. One such configuration may be in the latch arrangement to alter its set and reset characteristics for special response situations.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Fluid control apparatus comprising:

means defining a chamber;

a member forming a common boundary dividing said chamber into first and second compartments and being movable between blocking and open positions;

wall elements in said chamber cooperable with said member when in said blocking position to subdivide said first compartment into at least three cavities, at least two of said cavities being open to each other when said member is in said open position;

control means, including ducts, selectively operable connecting each of two of said cavities to inlet sources of fluid at predetermined pressures, duct means connecting at least one of said cavities to an outlet sump; and means for supplying fluid to said second compartment at a biasing pressure less than said predetermined pressure and greater than the pressure of said sump.

2. Apparatus as described in claim 1 wherein said fluid pressures and surface areas of said member subjected to said pressures are so related that the force exerted by the fluid in said cavities is sufficient to move said member to said open position connecting an inlet cavity to said sump when one of said inlet cavities is supplied with fluid at said predetermined pressure.

3. Apparatus as described in claim 1 wherein the cavity connected to said outlet sump is further divided into two sub-cavities by a wall element cooperable with said member when in said blocking position, said member area being unequal in said sub-cavities and said outlet duct being in the sub-cavity having the smaller area.

4. Apparatus as described in claim 1 wherein the surface areas of said member and said fluid pressures are so related that the force exerted on said member in said blocking position by the fluid in said inlet cavities is sufficient to move said member to said open position when said inlet cavities are concurrently supplied with fluid at said predetermined pressures.

5. Apparatus as described in claim 4 wherein said predetermined pressures of fluid supplied to said inlets are different for each inlet.

6. Apparatus as described in claim 4 wherein said predetermined pressures of fluid supplied to said inlets are the same for each said inlet.

7. Apparatus as described in claim 4 wherein said predetermined pressures of said fluid supplied to said inlets and said surface areas are so proportioned that the termination of fluid pressure in one said inlet is ineffective to permit said member to return to said blocking position.

8. Apparatus as described in claim 1 further including an additional wall element cooperable with said member in said blocking position to form an additional cavity separating the cavity connected to said sump from the cavities connected to said inlet sources.

9. Apparatus as described in claim 8 wherein said additional cavity is connected to said sump through a flow path of impedance high relative to said outlet duct.

10. Fluid control apparatus comprising:

means defining a chamber;

a movable member dividing said chamber into first and second compartments, said member being movable between first and second positions in said chamber in response to the greater of the forces applied to opposite surfaces thereof as a function of fluid pressure and effective member area subjected to said pressure;

wall portions in said chamber cooperable with one surface of said member in said first position to form said first compartment into at least three cavities with a portion of said one surface forming a part of the cavity boundary in each said cavity;

duct means connecting fluid from a source to said second compartment at a predetermined pressure to act on the other surface of said member and move said member to said first position, selectively operable inlet means connected to each of at least two of said cavities for supplying fluid thereto at a pressure greater than said predetermined pressure to act on exposed surfaces of said one side to move said member to said second position in opposition to the force in said second compartment; and outlet means connected to at least one of said cavities for producing a fluid pressure signal indicative of the position of said member.

* * * * *